United States Patent
Klowan et al.

(10) Patent No.: US 11,185,185 B2
(45) Date of Patent: Nov. 30, 2021

(54) CONFIGURABLE MOUNTING BRACKET FOR CURTAIN RODS

(71) Applicant: Kenney Manufacturing Company, Warwick, RI (US)

(72) Inventors: Jeffrey Klowan, Woonsocket, RI (US); Thomas Borawski, Coventry, RI (US)

(73) Assignee: Kenney Manufacturing Company, Warwick, RI (US)

(*) Notice: Subject to any disclaimer, the term of this patent is extended or adjusted under 35 U.S.C. 154(b) by 3 days.

(21) Appl. No.: 16/854,575

(22) Filed: Apr. 21, 2020

(65) Prior Publication Data
US 2020/0345167 A1 Nov. 5, 2020

Related U.S. Application Data

(60) Provisional application No. 62/843,183, filed on May 3, 2019.

(51) Int. Cl.
*F16M 13/02* (2006.01)
*A47H 1/122* (2006.01)

(52) U.S. Cl.
CPC .......... *A47H 1/122* (2013.01); *F16M 13/027* (2013.01)

(58) Field of Classification Search
CPC . A47H 1/122; A47H 1/10; A47H 1/12; A47H 1/14; A47H 1/142; F16M 13/027
See application file for complete search history.

(56) References Cited

U.S. PATENT DOCUMENTS

| | | | | |
|---|---|---|---|---|
| 3,704,851 | A * | 12/1972 | Cormier | A47H 1/10 248/265 |
| 4,140,294 | A * | 2/1979 | Zwarts | A47H 1/122 248/265 |
| 7,322,552 | B1 * | 1/2008 | Lin | A47H 1/122 160/89 |
| 9,427,102 | B2 * | 8/2016 | Weaver | F16M 13/02 |
| 9,578,995 | B2 * | 2/2017 | Hanley | A47H 13/04 |
| 10,376,086 | B1 * | 8/2019 | Mustafa | F16M 13/022 |
| 2019/0282017 | A1 * | 9/2019 | Hanley | A47H 1/142 |
| 2020/0305629 | A1 * | 10/2020 | Hanley | A47H 1/142 |
| 2021/0100388 | A1 * | 4/2021 | James | A47H 1/142 |

* cited by examiner

*Primary Examiner* — Anita M King
(74) *Attorney, Agent, or Firm* — Adler Pollock & Sheehan P.C

(57) ABSTRACT

A curtain rod bracket assembly with a bracket base that is configured to be mounted to a wall or a ceiling, and a bracket arm defining at least one curtain rod supporting portion that is configured to hold a curtain rod in a generally horizontal orientation, and first and second mounting locations. The first mounting location is configured to be coupled to the bracket base when the bracket base is mounted to a wall, while maintaining a curtain rod supporting portion such that it is configured to hold a curtain rod in a generally horizontal orientation. The second mounting location is configured to be coupled to the bracket base when the bracket base is mounted to a ceiling, while maintaining a curtain rod supporting portion such that it is configured to hold a curtain rod in a generally horizontal orientation.

5 Claims, 10 Drawing Sheets

CONFIGURABLE MOUNTING BRACKET FOR CURTAIN RODS

CROSS-REFERENCE TO RELATED APPLICATION

This application claims priority to Provisional Patent Application No. 62/843,183, filed on May 3, 2019, the entire disclosure of which is incorporated herein by reference for all purposes.

FIELD OF THE INVENTION

The invention relates generally to curtain rods, and more particularly to a curtain rod mounting bracket.

BACKGROUND OF THE INVENTION

Traditional drapery fixtures and hardware brackets are designed to support a single curtain rod, and are typically configured for mounting on either a wall or a ceiling. Such a fixed-position configuration lacks flexibility and tends to limit the available installation options.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In one aspect, the present invention features a curtain rod mounting bracket assembly that includes a bracket base, and a bracket arm having a first end and a second end. At least one of the bracket arm ends can be configured to hold at least one curtain rod. The bracket arm can be attached to the bracket base at multiple alternative attachment points to enable a user to electively install the bracket assembly in a horizontal orientation or vertical orientation.

In another aspect a curtain rod bracket assembly includes a bracket base that is configured to be mounted to a wall or a ceiling, and a bracket arm defining at least one curtain rod supporting portion that is configured to hold a curtain rod in a generally horizontal orientation, and first and second mounting locations. The first mounting location is configured to be coupled to the bracket base when the bracket base is mounted to a wall, while maintaining a curtain rod supporting portion such that it is configured to hold a curtain rod in a generally horizontal orientation. The second mounting location is configured to be coupled to the bracket base when the bracket base is mounted to a ceiling, while maintaining a curtain rod supporting portion such that it is configured to hold a curtain rod in a generally horizontal orientation.

Some examples include one of the above and/or below features, or any combination thereof. In some examples the bracket base comprises a wall/ceiling attachment portion and a bracket arm mounting portion. In an example the wall/ceiling attachment portion comprises a generally flat portion that defines a plurality of openings that are configured to hold fasteners that allow the wall/ceiling attachment portion to be attached to a vertical surface or a horizontal surface. In an example the generally flat portion comprises two spaced openings, one near each opposed end of the generally flat portion. In an example the bracket arm mounting portion is integral with the generally flat portion and is configured to be coupled to both the first mounting location of the bracket arm and the second mounting location of the bracket arm. In an example the coupling is accomplished using a mounting screw that is received in a tapped hole on a flat end face of the bracket arm mounting portion. In an example a curtain rod supporting portion comprises a generally "U"-shaped portion that is oriented such that it can hold a curtain rod in a generally horizontal orientation.

Some examples include one of the above and/or below features, or any combination thereof. In an example the first mounting location includes a first opening through which a fastener can pass and the second mounting location includes a second opening through which the fastener can pass. In some examples the first mounting location comprises a flat face that is configured to be in a generally vertical orientation when the bracket base is coupled to a wall. In an example the second mounting location comprises a flat face that is configured to be in a generally horizontal orientation when the bracket base is coupled to a ceiling. In an example the horizontal and vertical orientations are accomplished by orienting the first and second mounting locations at right angles to each other, such that the first mounting location is generally vertical and the second mounting location is generally horizontal, regardless of whether the bracket base portion is coupled to either bracket arm mounting location. In an example the first bracket mounting location is at one end of the bracket arm and second bracket mounting location is adjacent to the one end of the bracket arm. In an example an opposite end of the bracket arm carries the curtain rod supporting portion.

Some examples include one of the above and/or below features, or any combination thereof. In some examples the bracket arm comprises first and second opposed ends, and the first mounting location is proximate the first end of the bracket arm. In an example the second mounting location is in about the middle of the bracket arm, between its two ends. In an example the bracket arm comprises first and second spaced curtain rod supporting portions. In an example the second mounting location is between the first and second curtain rod supporting portions. In an example the first and second curtain rod supporting portions are both generally "U"-shaped features in which a curtain rod can be held in a generally horizontal orientation.

In another aspect a curtain rod bracket assembly includes a bracket base that is configured to be mounted to a wall or a ceiling, wherein the bracket base comprises a wall/ceiling attachment portion and a bracket arm mounting portion, wherein the wall/ceiling attachment portion comprises a generally flat portion that comprises two spaced openings, one near each opposed end of the generally flat portion, wherein the openings are configured to hold fasteners that allow the wall/ceiling attachment portion to be attached to a vertical surface or a horizontal surface. There is a bracket arm defining at least one curtain rod supporting portion that is configured to hold a curtain rod in a generally horizontal orientation, and first and second mounting locations. The first mounting location is configured to be coupled to the bracket base when the bracket base is mounted to a wall, while maintaining a curtain rod supporting portion such that it is configured to hold a curtain rod in a generally horizontal orientation. The first mounting location comprises a flat face that is configured to be in a generally vertical orientation when the bracket base is coupled to a wall. The second mounting location is configured to be coupled to the bracket base when the bracket base is mounted to a ceiling, while maintaining a curtain rod supporting portion such that it is configured to hold a curtain rod in a generally horizontal orientation. The second mounting location comprises a flat face that is configured to be in a generally horizontal orientation when the bracket base is coupled to a ceiling. The first mounting location includes a first opening through which a fastener can pass and the second mounting location includes a second opening through which the fastener can pass. The bracket arm mounting portion is integral with the generally flat portion and is configured to be coupled to both the first mounting location of the bracket arm and the second mounting location of the bracket arm. The coupling is accomplished using a mounting screw that is received in a tapped hole on a flat end face of the bracket arm mounting portion. The horizontal and vertical orientations are accomplished by orienting the first and second mounting locations at right angles to each other, such that the first mounting location is generally vertical and the second mounting location is generally horizontal, regardless of whether the bracket base portion is coupled to either bracket arm mounting location. The bracket arm comprises first and second opposed ends. The first bracket mounting location is at the first end of the bracket arm and the second bracket mounting location is adjacent to the first end of the bracket arm. The second end of the bracket arm carries the curtain rod supporting portion.

In another aspect a curtain rod bracket assembly includes a bracket base that is configured to be mounted to a wall or a ceiling, wherein the bracket base comprises a wall/ceiling attachment portion and a bracket arm mounting portion, wherein the wall/ceiling attachment portion comprises a generally flat portion that comprises two spaced openings, one near each opposed end of the generally flat portion, wherein the openings are configured to hold fasteners that allow wall/ceiling attachment portion to be attached to a vertical surface or a horizontal surface. There is a bracket arm defining at least one curtain rod supporting portion that is configured to hold a curtain rod in a generally horizontal orientation, and first and second mounting locations. The first mounting location is configured to be coupled to the bracket base when the bracket base is mounted to a wall, while maintaining a curtain rod supporting portion such that it is configured to hold a curtain rod in a generally horizontal orientation. The first mounting location comprises a flat face that is configured to be in a generally vertical orientation when the bracket base is coupled to a wall. The second mounting location is configured to be coupled to the bracket base when the bracket base is mounted to a ceiling, while maintaining a curtain rod supporting portion such that it is configured to hold a curtain rod in a generally horizontal orientation. The second mounting location comprises a flat face that is configured to be in a generally horizontal orientation when the bracket base is coupled to a ceiling. The first mounting location includes a first opening through which a fastener can pass and the second mounting location includes a second opening through which the fastener can pass. The bracket arm mounting portion is integral with the generally flat portion and is configured to be coupled to both the first mounting location of the bracket arm and the second mounting location of the bracket arm. The coupling is accomplished using a mounting screw that is received in a tapped hole on a flat end face of the bracket arm mounting portion. The horizontal and vertical orientations are accomplished by orienting the first and second mounting locations at right angles to each other, such that the first mounting location is generally vertical and the second mounting location is generally horizontal, regardless of whether the bracket base portion is coupled to either bracket arm mounting location. The bracket arm comprises first and second spaced curtain rod supporting portions. The second mounting location is in about the middle of the bracket arm, between its two ends and between the first and second curtain rod supporting portions.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

Further features and advantages as well as the structure and operation of various embodiments are illustrated by way of example and not limitation in the Figures (FIGS.) of the accompanying drawings in which like references indicate similar elements.

DETAILED DESCRIPTION OF SPECIFIC EMBODIMENTS

Figure 1A:
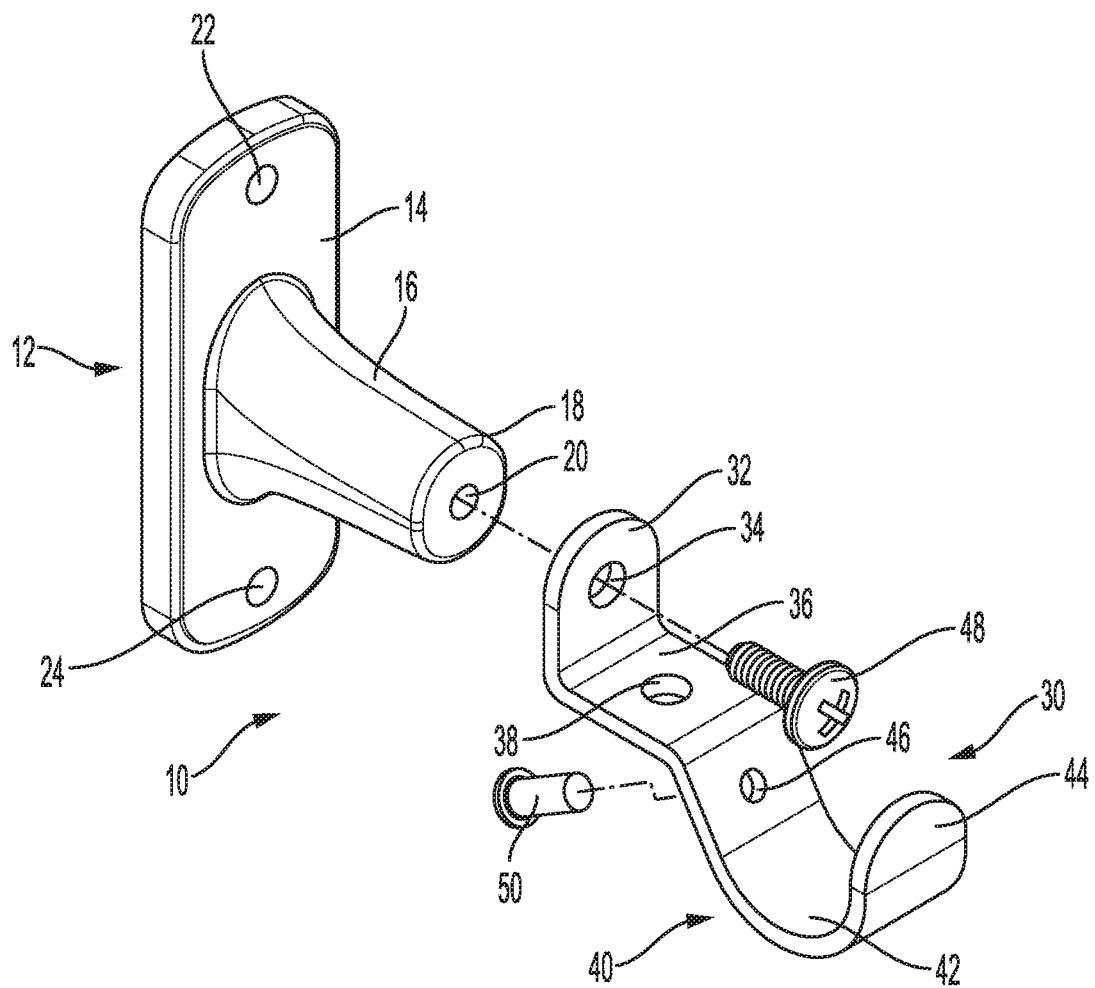
FIG. 1A is an exploded perspective view of a rod mounting bracket assembly for a single rod in a wall-mounting configuration.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Generally, in one aspect, the present invention provides a bracket assembly for mounting curtain rods. The bracket assembly is configurable so that it can be optionally installed in a horizontal orientation on a wall or in a vertical orientation from a ceiling. In various embodiments, the bracket assembly can be configured to support one or more curtain rods. An advantage of the present invention is that it provides convenience and versatility by allowing for both ceiling and wall mounting with a single bracket assembly.

Referring to FIGS. 1A-4B, the present invention, in various embodiments, provides a curtain rod mounting bracket assembly that can be installed on a ceiling or a wall, and can support one or two curtain rods. In the embodiment shown in FIGS. 1A, 1B, 2A, and 2B, the bracket assembly 10 can be installed in a horizontal orientation on a wall or in a vertical orientation from a ceiling, and is configured to hold one curtain rod. In another embodiment shown in FIGS. 3A, 3B, 4A, and 4B, the bracket assembly 60 can be installed in a horizontal orientation on a wall or in a vertical orientation from a ceiling, and is configured to hold two curtain rods. The bracket assembly can be made of plastic, metal, wood, glass, composite materials, or any combination of such materials.

Rod mounting bracket assembly 10, FIGS. 1A, 1B, 2A, and 2B (labelled as 10a when mounted to a ceiling), is configured to hold a single curtain rod (not shown). Rod mounting bracket assembly 10 comprises bracket base 12 and bracket arm 30. Bracket arm 30 is in an example a unitary metal or plastic part. Bracket arm 30 comprises a first curtain rod supporting portion 40, a first mounting location 32, and a second mounting location 36. Bracket base 12 is a separate part that in an example is a unitary metal or plastic part. Bracket base 12 comprises wall/ceiling attachment portion 14 and bracket arm mounting portion 16.

Wall/ceiling attachment portion 14 of bracket base 12 is in an example a generally flat portion that defines one, two, or more openings that are configured to hold fasteners (such as screws or nails) that allow wall/ceiling attachment portion 14 to be attached to a vertical surface (e.g., a wall, a window frame, or trim) or a horizontal surface (e.g., a ceiling). In this example there are two spaced openings 22 and 24, one near each opposed end of wall/ceiling attachment portion 14, as shown.

Wall/ceiling attachment portion 14 in an example also includes an integral bracket arm mounting portion 16 that is configured to be coupled to either the first mounting location 32 of bracket arm 30 or the second mounting location 36 of bracket arm 30. This coupling can be accomplished using mounting screw 48 (which in an example is a machine screw) that is received in tapped hole 20 on end face 18 of bracket arm mounting portion 16. First mounting location 32 includes opening 34 through which screw 48 can pass. Second mounting location 36 includes opening 38 through which screw 48 can pass.

Figure 1B:
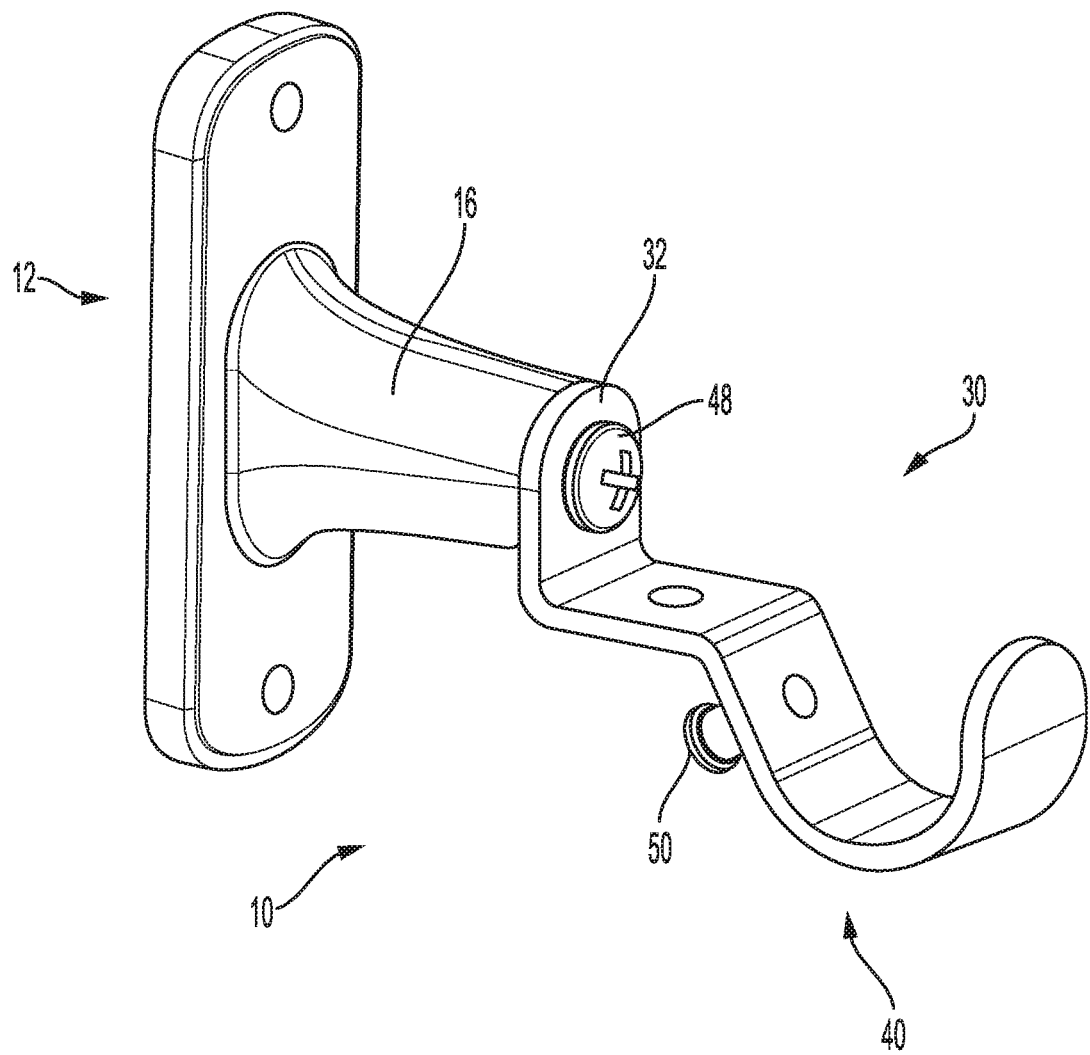
FIG. 1B is an assembled view of the rod mounting bracket assembly for a single rod in a wall-mounting configuration of FIG. 1A.
Figure 2A:
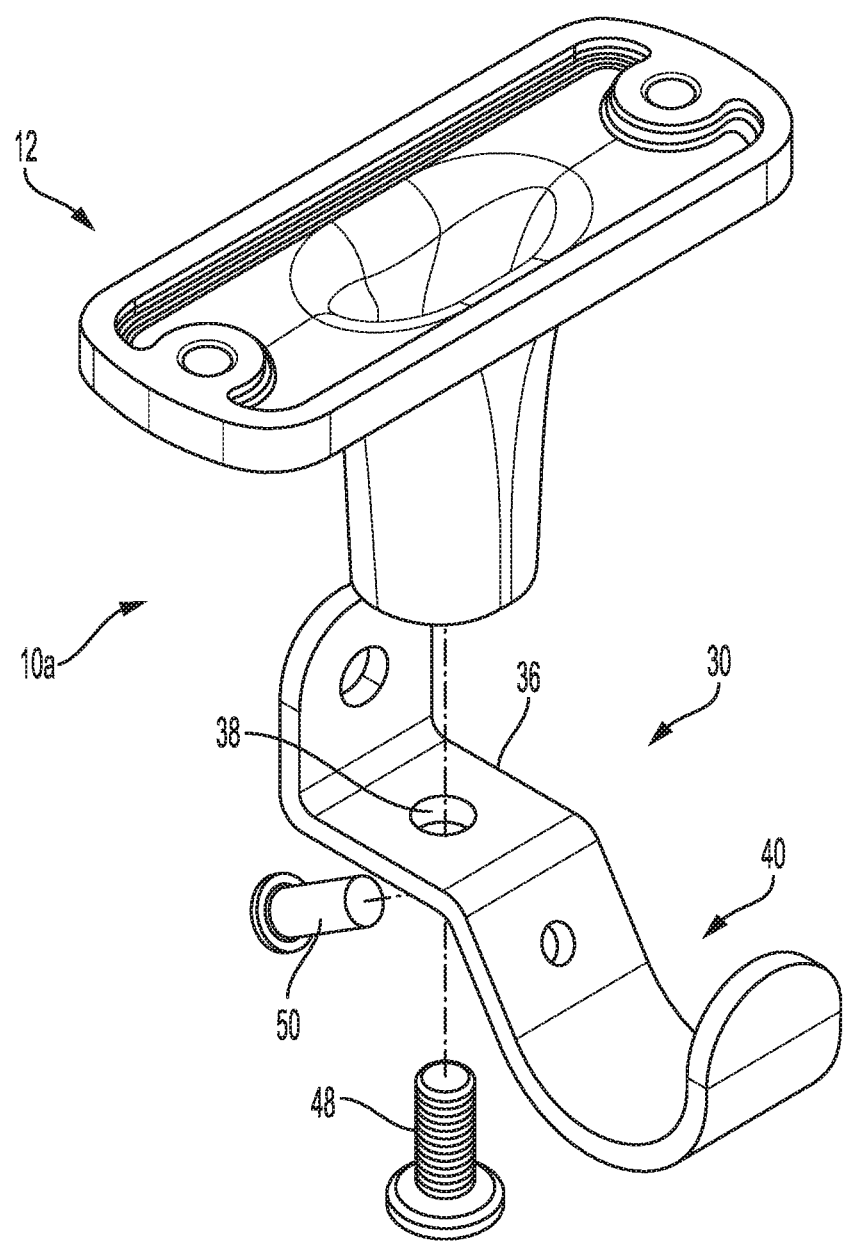
FIG. 2A is an exploded perspective view of the rod mounting bracket assembly for a single rod of FIGS. 1A and 1B in a ceiling-mounting configuration.
Figure 2B:
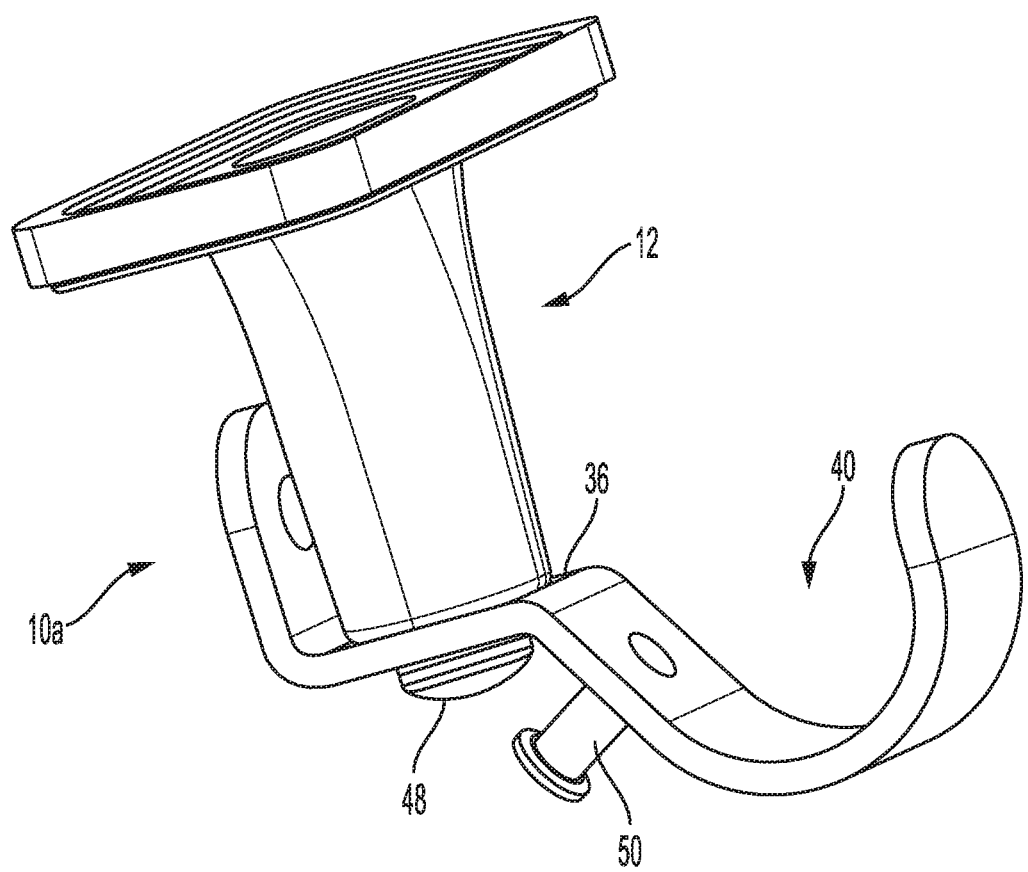
FIG. 2B is an assembled view of the rod mounting bracket assembly for a single rod in a ceiling-mounting configuration of FIG. 2A.

In an example first mounting location 32 is a flat face that is configured to be in a generally vertical orientation when bracket base 12 is coupled to a wall, as shown in FIGS. 1A and 1B. In an example second mounting location 36 is a flat face that is configured to be in a generally horizontal orientation when bracket base 12 is coupled to a ceiling, as shown in FIGS. 2A and 2B. In the present example the horizontal and vertical orientations are accomplished by placing mounting locations 32 and 36 at right angles, such that location 32 is vertical and location 36 is horizontal regardless of whether bracket base portion 16 is coupled to bracket arm location 32 or location 36. Since locations 32 and 36 are at and adjacent to one end of arm 30, respectively, the opposite end of arm 30 can carry the rod support. In both cases "U"-shaped curtain rod support 42, which is part of curtain rod supporting portion 40 with bracket arm distal end 44, is oriented such that it can support a curtain rod (not shown) in a generally horizontal orientation. Set screw 50 that is configured to be held in opening 46 can be used to hold a curtain rod in place in support 42, as is known in the field.

Rod mounting bracket assembly 60, FIGS. 3A, 3B, 4A, and 4B (labelled as 60a when mounted to a ceiling), is configured to hold two curtain rods (not shown). Rod mounting bracket assembly 60 comprises bracket base 12 and bracket arm 70. Bracket arm 70 is in an example a unitary metal or plastic part. Bracket arm 70 comprises a first curtain rod supporting portion 82, a second curtain rod supporting portion 92, a first mounting location 72, a second mounting location 84, and distal end 94. Bracket base 12 is a separate part that in an example is a unitary metal or plastic part. Bracket base 12 comprises wall/ceiling attachment portion 14 and bracket arm mounting portion 16.

Wall/ceiling attachment portion 14 of bracket base 12 is in an example a generally flat portion that defines one, two, or more openings that are configured to hold fasteners (such as screws or nails) that allow wall/ceiling attachment portion 14 to be attached to a vertical surface (e.g., a wall, a window frame, or trim) or a horizontal surface (e.g., a ceiling). In this example there are two spaced openings 22 and 24, one near each opposed end of wall/ceiling attachment portion 14, as shown.

Wall/ceiling attachment portion 14 in an example also includes an integral bracket arm mounting portion 16 that is configured to be coupled to either the first mounting location 72 of bracket arm 70 or the second mounting location 84 of bracket arm 70. This coupling can be accomplished using mounting screw 76 (which in an example is a machine screw) that is received in tapped hole 20 on end face 18 of bracket arm mounting portion 16. First mounting location 72 includes opening 74 through which screw 76 can pass. Second mounting location 84 includes opening 86 through which screw 76 can pass.

Figure 3A:
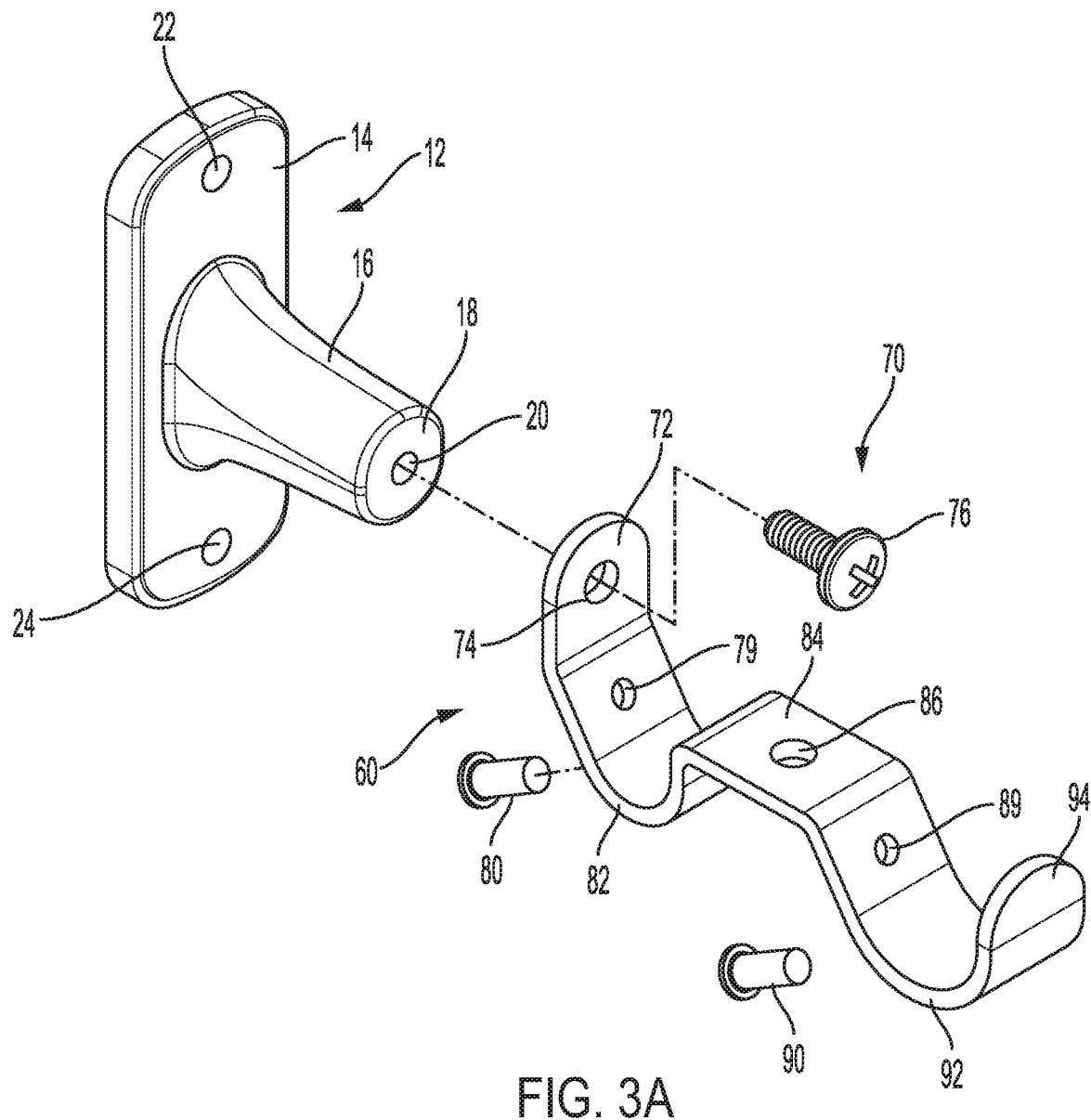
FIG. 3A is an exploded perspective view of another rod mounting bracket assembly for a double rod in a wall-mounting configuration.
Figure 3B:
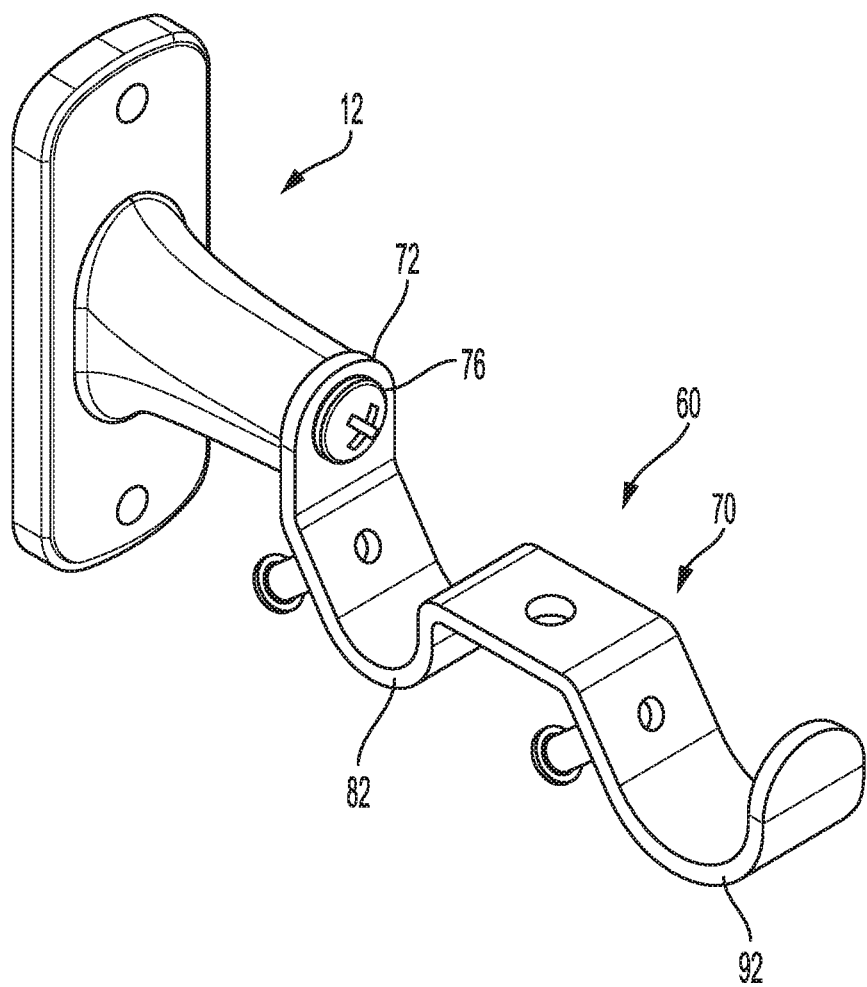
FIG. 3B is an assembled view of the rod mounting bracket assembly for a double rod in a wall-mounting configuration of FIG. 3A.
Figure 4A:
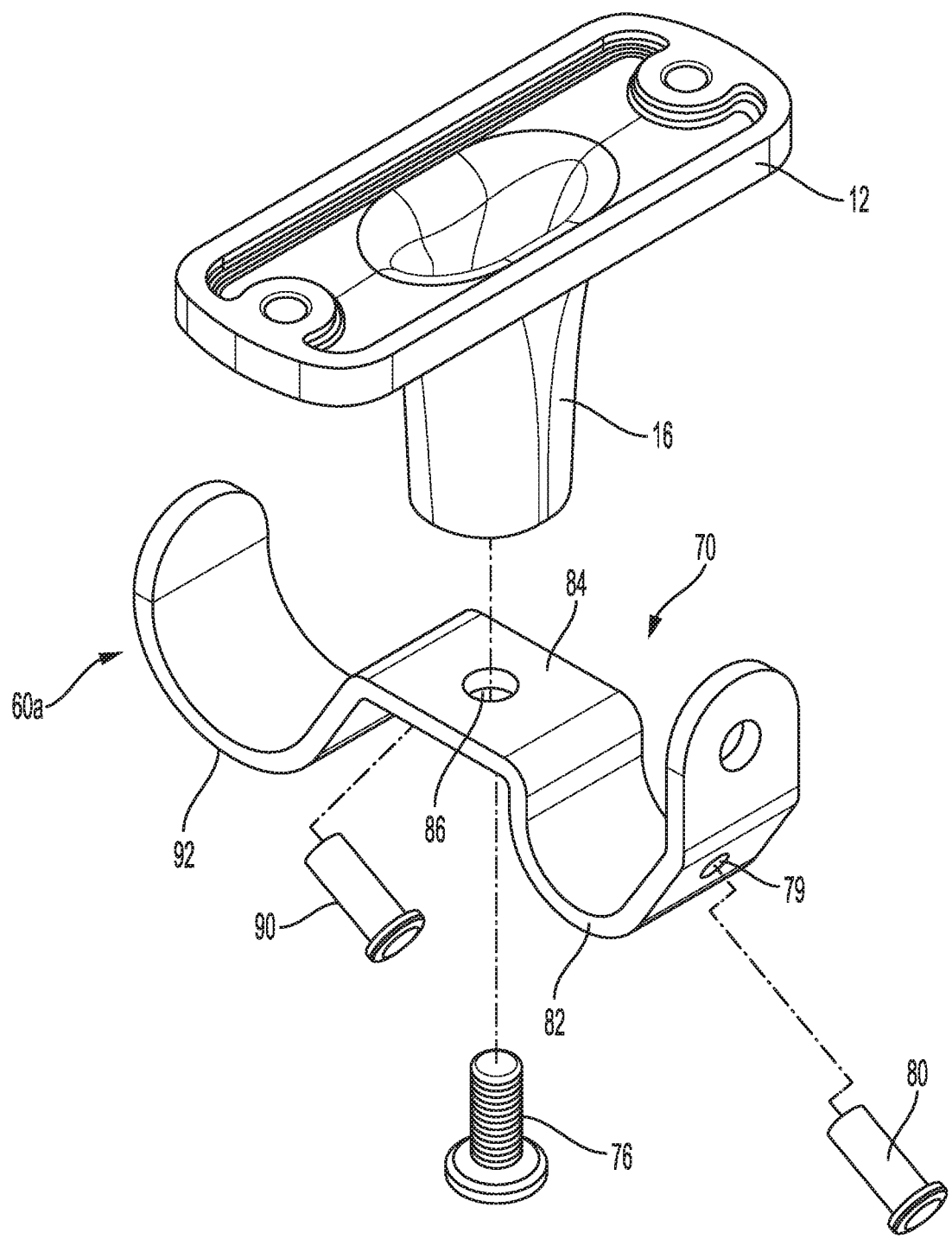
FIG. 4A is an exploded perspective view of a rod mounting bracket assembly for a double rod of FIGS. 3A and 3B in a ceiling-mounting configuration.
Figure 4B:
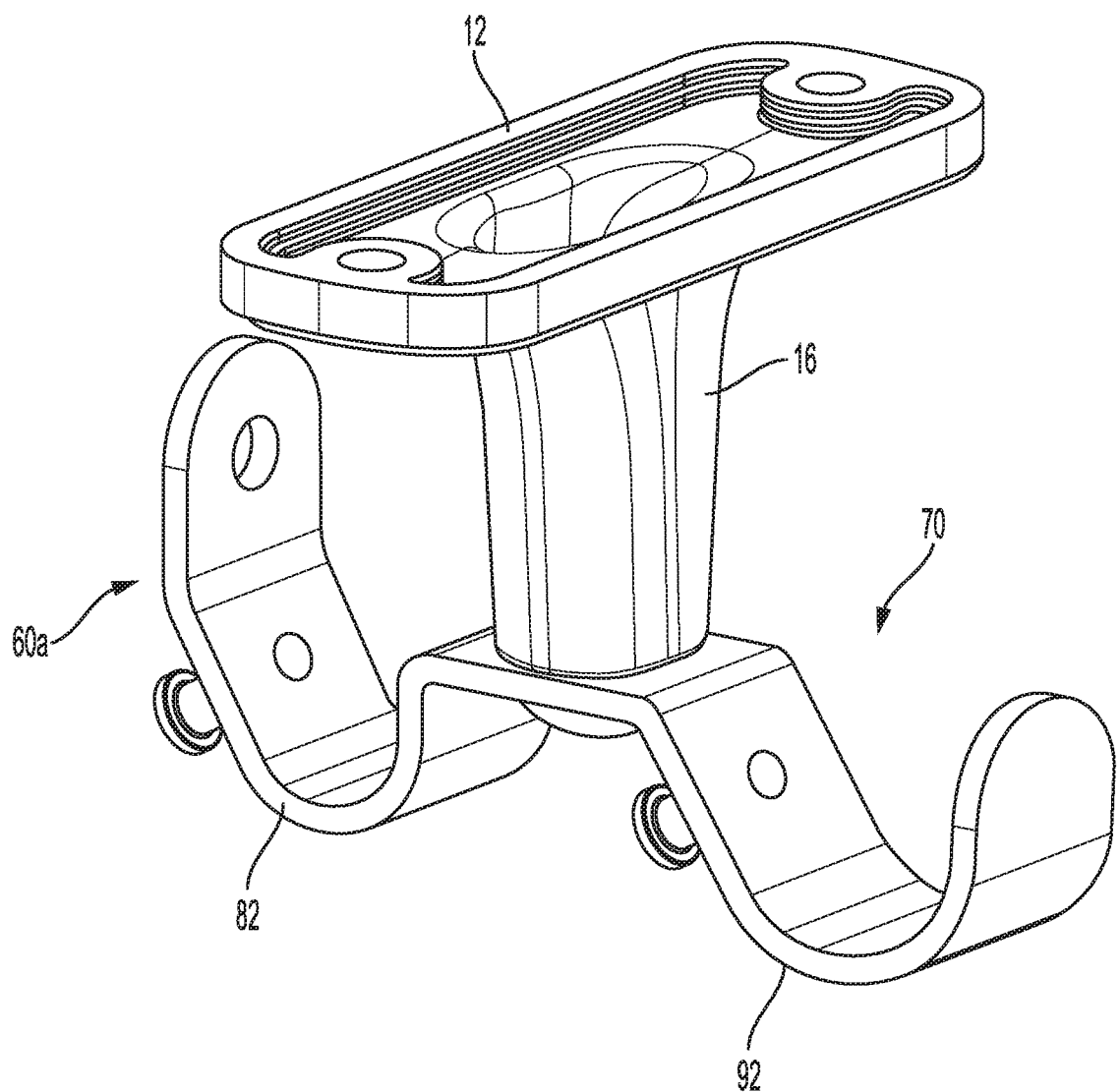
FIG. 4B is an assembled view of the rod mounting bracket assembly for a double rod in a ceiling-mounting configuration of FIG. 4A.

In an example first mounting location 72 is a flat face that is configured to be in a generally vertical orientation when bracket base 12 is coupled to a wall, as shown in FIGS. 3A and 3B. In an example second mounting location 84 is a flat face that is configured to be in a generally horizontal orientation when bracket base 12 is coupled to a ceiling, as shown in FIGS. 4A and 4B. In the present example the horizontal and vertical orientations are accomplished by placing mounting locations 72 and 84 at right angles, such that location 72 is vertical and location 84 is horizontal regardless of whether bracket base portion 16 is coupled to bracket arm location 72 or location 84. In order to accommodate two separate spaced curtain rod supporting portions 82 and 92, location 72 is at one end of arm 70 and location 84 is in about the middle of arm 70, between curtain rod supporting portions 82 and 92. Curtain rod supporting portions 82 and 92 are both generally "U"-shaped features into which a curtain rod (not shown) can fit, in generally horizontal orientations. Set screws 80 and 90 are configured to be held in openings 79 and 89 respectively, to hold a curtain rod in place in the respective support 82 and 92, as is known in the field.

Figure 5:
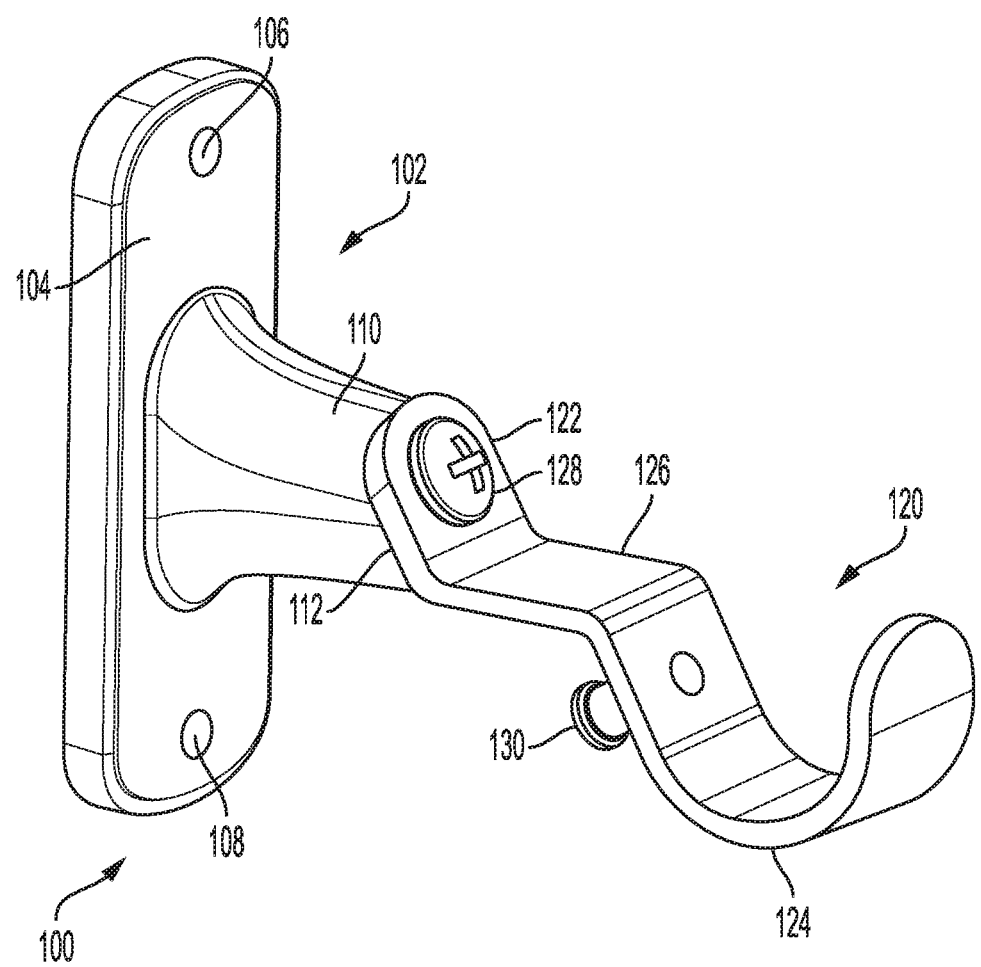
FIG. 5 is an assembled view of another rod mounting bracket assembly in a wall-mounting configuration.
Figure 6:
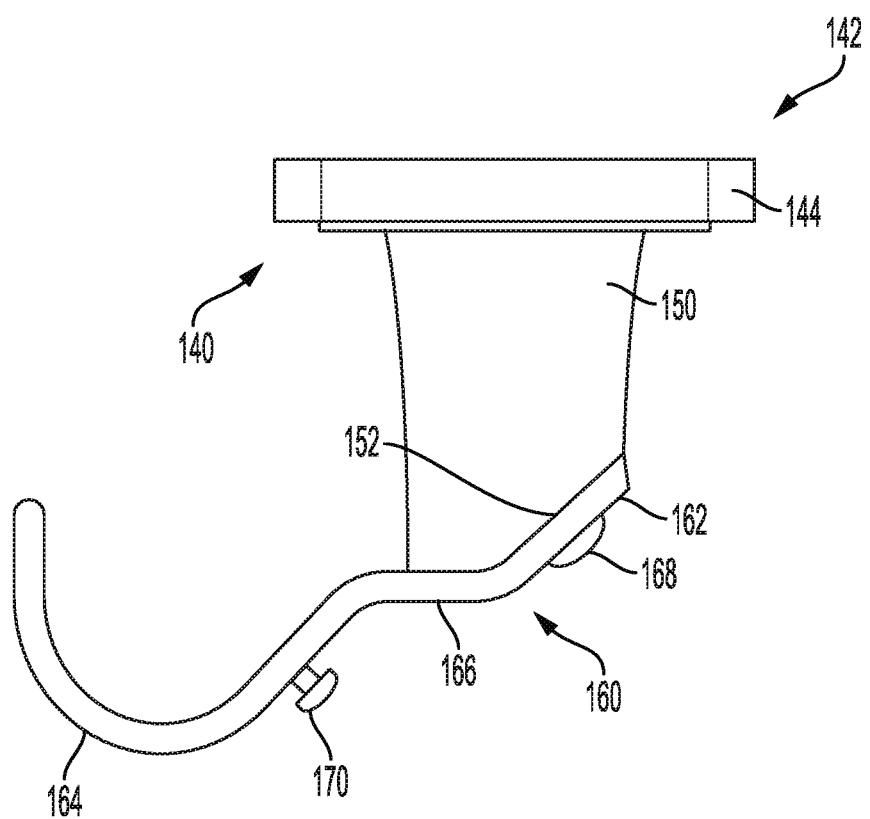
FIG. 6 is an assembled view of another rod mounting bracket assembly in a ceiling-mounting configuration.

In another embodiment shown in FIGS. 5 and 6, the bracket assembly can be installed in a horizontal orientation on a wall or in a vertical orientation from a ceiling, and is configured to hold one curtain rod. Also, in this embodiment there is a single location at which the bracket arm is mounted to the bracket base that can accommodate both horizontal and vertical orientations. However, following the principles set forth above regarding FIGS. 3A, 3B, 4A, and 4B, this bracket assembly can be configured to hold two curtain rods. The bracket assembly can be made of plastic, metal, wood, glass, composite materials, or any combination of such materials. Also, although FIGS. 5 and 6 use different numbering for the curtain rod bracket mounting assemblies, in fact the assembly shown in FIG. 5 can be used in both a horizontal orientation as depicted in FIG. 5 and a vertical orientation as depicted in FIG. 6.

Rod mounting bracket assembly 100, FIG. 5 is configured to hold a single curtain rod (not shown). Rod mounting bracket assembly 100 comprises bracket base 102 and bracket arm 120. Bracket arm 120 is in an example a unitary metal or plastic part. Bracket arm 120 comprises a curtain rod supporting portion 124, and a single mounting location 122. Set screw 130 is configured to be used to hold a curtain rod in place in support 124, as is known in the field. Bracket base 102 is a separate part that in an example is a unitary metal or plastic part. Bracket base 102 comprises wall/ceiling attachment portion 104 and bracket arm mounting portion 110.

Wall/ceiling attachment portion 104 of bracket base 102 is in an example a generally flat portion that defines one, two, or more openings that are configured to hold fasteners (such as screws or nails) that allow wall/ceiling attachment portion 104 to be attached to a vertical surface (e.g., a wall, a window frame, or trim) or a horizontal surface (e.g., a ceiling). In this example there are two spaced openings 106 and 108, one near each opposed end of wall/ceiling attachment portion 104, as shown.

Wall/ceiling attachment portion 104 in an example also includes an integral bracket arm mounting portion 110 that is configured to be coupled to the mounting location 122 of bracket arm 120. This coupling can be accomplished using mounting screw 128 (which in an example is a machine screw) in the same manner as described above.

In an example mounting location 122 is a flat face that is angled relative to small connecting portion 126. This angle is greater than zero degrees and less than ninety degrees. End face 112 of bracket arm mounting portion 110 is angled relative to the flat back face of portion 104, such that when the two are coupled portion 126 is horizontal as shown, thus placing rod supporting portion 124 horizontally as well.

Rod mounting bracket assembly 140, FIG. 6 is configured to hold a single curtain rod (not shown). Rod mounting bracket assembly 140 comprises bracket base 142 and bracket arm 160. Bracket arm 160 is in an example a unitary metal or plastic part. Bracket arm 160 comprises a curtain rod supporting portion 164, and a mounting location 162. Set screw 170 is configured to be used to hold a curtain rod in place in support 164, as is known in the field. Bracket base 142 is a separate part that in an example is a unitary metal or plastic part. Bracket base 142 comprises wall/ceiling attachment portion 144 and bracket arm mounting portion 150.

Ceiling attachment portion 144 of bracket base 142 is in an example a generally flat portion that defines one, two, or more openings (not shown in this view) that are configured to hold fasteners (such as screws or nails) that allow wall/ceiling attachment portion 144 to be attached to a vertical surface (e.g., a wall, a window frame, or trim) or a horizontal surface (e.g., a ceiling).

Wall/ceiling attachment portion 144 in an example also includes an integral bracket arm mounting portion 150 that is configured to be coupled to the mounting location 162 of bracket arm 160. This coupling can be accomplished using mounting screw 168 (which in an example is a machine screw) in the same manner as described above.

In an example mounting location 162 is a flat face that is angled relative to small connecting portion 166. This angle is greater than zero degrees and less than ninety degrees. End face 152 of bracket arm mounting portion 150 is angled relative to the flat back face of portion 144, such that when the two are coupled portion 166 is horizontal as shown, thus placing rod supporting portion 164 horizontally as well.

While the present invention has been described with reference to certain embodiments thereof, it should be understood by those skilled in the art that various changes may be made and equivalents may be substituted without departing from the true spirit and scope of the invention. In addition, many modifications may be made to adapt to a particular situation, indication, material and composition of matter, process step or steps, without departing from the spirit and scope of the present invention. All such modifications are intended to be within the scope of the present invention.

What is claimed is:

1. A curtain rod bracket assembly, comprising:
    a bracket base that is configured to be mounted to a wall or a ceiling;
    a bracket arm defining at least one curtain rod supporting portion that is configured to hold a curtain rod in a generally horizontal orientation, and first and second mounting locations;
    wherein the first mounting location is configured to be coupled to the bracket base when the bracket base is mounted to the wall, while maintaining the at least one curtain rod supporting portion such that it is configured to hold the curtain rod in a generally horizontal orientation; and
    wherein the second mounting location is configured to be coupled to the bracket base when the bracket base is mounted to the ceiling, while maintaining the at least one curtain rod supporting portion such that it is configured to hold the curtain rod in a generally horizontal orientation,
    wherein the bracket base comprises a wall/ceiling attachment portion and a bracket arm mounting portion,
    wherein the bracket arm mounting portion is integral with the generally flat portion and is configured to be coupled to both the first mounting location of the bracket arm and the second mounting location of the bracket arm,
    wherein the coupling is accomplished using a mounting screw that is received in a tapped hole on a flat end face of the bracket arm mounting portion.

2. A curtain rod bracket assembly, comprising:
    a bracket base that is configured to be mounted to a wall or a ceiling;
    a bracket arm defining at least one curtain rod supporting portion that is configured to hold a curtain rod in a generally horizontal orientation, and first and second mounting locations;
    wherein the first mounting location is configured to be coupled to the bracket base when the bracket base is mounted to the wall, while maintaining the at least one curtain rod supporting portion such that it is configured to hold the curtain rod in a generally horizontal orientation; and
    wherein the second mounting location is configured to be coupled to the bracket base when the bracket base is mounted to the ceiling, while maintaining the at least one curtain rod supporting portion such that it is configured to hold the curtain rod in a generally horizontal orientation, wherein the first mounting location comprises a flat face that is configured to be in a generally vertical orientation when the bracket base is coupled to the wall, wherein the second mounting location comprises a flat face that is configured to be in a generally horizontal orientation when the bracket base is coupled to the ceiling, wherein the bracket arm comprises first and second opposed ends, and wherein the first mounting location is proximate the first end of the bracket arm, wherein the second mounting location is in about the middle of the bracket arm, between its two ends, wherein the bracket arm comprises first and second spaced curtain rod supporting portions.

3. The curtain rod bracket assembly of claim 2, wherein the second mounting location is between the first and second curtain rod supporting portions.

4. The curtain rod bracket assembly of claim 3, wherein the first and second curtain rod supporting portions are both generally "U"-shaped features in which a curtain rod can be held in a generally horizontal orientation.

5. A curtain rod bracket assembly, comprising:

a bracket base that is configured to be mounted to a wall or a ceiling, wherein the bracket base comprises a wall/ceiling attachment portion and a bracket arm mounting portion, wherein the wall/ceiling attachment portion comprises a generally flat portion that comprises two spaced openings, one near each opposed end of the generally flat portion, wherein the openings are configured to hold fasteners that allow the wall/ceiling attachment portion to be attached to a vertical surface or a horizontal surface;

a bracket arm defining at least one curtain rod supporting portion that is configured to hold a curtain rod in a generally horizontal orientation, and first and second mounting locations;

wherein the first mounting location is configured to be coupled to the bracket base when the bracket base is mounted to the wall, while maintaining the at least one curtain rod supporting portion such that it is configured to hold the curtain rod in a generally horizontal orientation, wherein the first mounting location comprises a flat face that is configured to be in a generally vertical orientation when the bracket base is coupled to the wall;

wherein the second mounting location is configured to be coupled to the bracket base when the bracket base is mounted to the ceiling, while maintaining the at least one curtain rod supporting portion such that it is configured to hold the curtain rod in a generally horizontal orientation, wherein the second mounting location comprises a flat face that is configured to be in a generally horizontal orientation when the bracket base is coupled to the ceiling;

wherein the first mounting location includes a first opening through which a fastener can pass and the second mounting location includes a second opening through which the fastener can pass;

wherein the bracket arm mounting portion is integral with the generally flat portion and is configured to be coupled to both the first mounting location of the bracket arm and the second mounting location of the bracket arm, wherein the coupling is accomplished using a mounting screw that is received in a tapped hole on a flat end face of the bracket arm mounting portion;

wherein the horizontal and vertical orientations are accomplished by orienting the first and second mounting locations at right angles to each other, such that the first mounting location is generally vertical and the second mounting location is generally horizontal, regardless of whether the bracket base portion is coupled to either bracket arm mounting location;

wherein the bracket arm comprises first and second spaced curtain rod supporting portions; and wherein the second mounting location is in about the middle of the bracket arm, between its two ends and between the first and second curtain rod supporting portions.

* * * * *